(12) United States Patent
Shim et al.

(10) Patent No.: US 12,172,570 B2
(45) Date of Patent: Dec. 24, 2024

(54) AUTOMATIC LEVELING SYSTEM AND METHOD FOR A HEADLAMP

(71) Applicants: HYUNDAI MOTOR COMPANY, Seoul (KR); KIA CORPORATION, Seoul (KR)

(72) Inventors: Joon Bo Shim, Seoul (KR); Young Ho Son, Gyeongsan-si (KR); Jae Joon Park, Gyeongsan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 186 days.

(21) Appl. No.: 18/100,236

(22) Filed: Jan. 23, 2023

(65) Prior Publication Data

US 2024/0083342 A1    Mar. 14, 2024

(30) Foreign Application Priority Data

Sep. 13, 2022    (KR) .......................... 10-2022-0115155

(51) Int. Cl.
*B60Q 1/08*    (2006.01)
*F21S 41/65*    (2018.01)
(Continued)

(52) U.S. Cl.
CPC ............ *B60Q 1/085* (2013.01); *F21S 41/657* (2018.01); *B60Q 2300/322* (2013.01); *F21W 2107/10* (2018.01)

(58) Field of Classification Search
CPC ...... B60Q 1/0023; B60Q 1/085; B60Q 1/115; B60Q 2300/322; F21S 41/657;
(Continued)

(56) References Cited

U.S. PATENT DOCUMENTS

| 5,660,454 A | * | 8/1997 | Mori ........................ B60Q 1/12 362/466 |
| 10,259,380 B2 | | 4/2019 | Ko et al. |

(Continued)

FOREIGN PATENT DOCUMENTS

| KR | 101734234 B1 | 5/2017 |
| KR | 101755513 B1 | 7/2017 |

(Continued)

*Primary Examiner* — Tyler J Lee
(74) *Attorney, Agent, or Firm* — Lempia Summerfield Katz LLC (57) ABSTRACT

Disclosed are an automatic leveling system and a method for a headlamp, which accurately detects whether a road is uphill or downhill, and a lateral gradient condition of the road. The system and method also automatically adjust a light radiating direction through the headlamp according to the road. Further, a sensor capable of scanning a road surface and a lamp module radiating light are integrated with each other, so a light irradiation position is accurately and rapidly adjusted according to a road condition, thus improving the accuracy and the reliability of the light irradiation position. Further, as the light irradiation position of a headlamp is adjusted by comparing image capturing information obtained through an image capturing device with sensing information obtained through a laser sensor, the deterioration of the aiming accuracy due to the mounting state of a camera is prevented.

23 Claims, 8 Drawing Sheets

(51) Int. Cl.
*F21S 41/657* (2018.01)
*F21W 107/10* (2018.01)

(58) Field of Classification Search
CPC ...... F21W 2107/10; G06T 2207/10024; G06T 2207/10028; G06T 2207/30256; G06T 7/73
See application file for complete search history.

(56) References Cited

U.S. PATENT DOCUMENTS

| | | | |
|---|---|---|---|
| 10,464,471 B2 * | 11/2019 | Sueishi | B60Q 1/0076 |
| 10,625,661 B2 | 4/2020 | Lee | |
| 10,647,246 B2 | 5/2020 | Lim et al. | |
| 10,953,787 B2 | 3/2021 | Bauch et al. | |
| 11,040,649 B2 * | 6/2021 | Mano | G01S 17/931 |
| 11,161,451 B1 | 11/2021 | Chen et al. | |
| 2017/0158112 A1 * | 6/2017 | Mouri | F21S 41/675 |
| 2017/0328533 A1 | 11/2017 | Ko et al. | |
| 2019/0291633 A1 * | 9/2019 | Sueishi | B60Q 1/0076 |
| 2020/0139878 A1 * | 5/2020 | Sung | B60Q 1/28 |
| 2020/0271786 A1 * | 8/2020 | Mano | G01S 17/89 |
| 2021/0129737 A1 | 5/2021 | Sakaguchi et al. | |

FOREIGN PATENT DOCUMENTS

| | | |
|---|---|---|
| KR | 101755514 B1 | 7/2017 |
| KR | 101795253 B1 | 11/2017 |
| KR | 20230021487 | 2/2023 |

\* cited by examiner

AUTOMATIC LEVELING SYSTEM AND METHOD FOR A HEADLAMP

CROSS-REFERENCE TO RELATED APPLICATION

The present application claims priority to Korean Patent Application No. 10-2022-0115155, filed on Sep. 13, 2022, the entire contents of which are incorporated herein for all purposes by this reference.

BACKGROUND

Field of the Disclosure

The present disclosure relates to an automatic leveling system and method for a headlamp, which accurately detects whether a road is uphill or downhill, and a lateral gradient condition of the road. Furthermore, the automatic leveling system and method for a headlamp automatically adjusts a light radiating direction through the headlamp according to the road.

Description of the Related Art

Generally, as a headlamp illuminates a forward path by radiating light in a vehicle's traveling direction when the vehicle is driven, the headlamp also gives visual information to a driver by radiating light onto the forward path during nighttime driving. Thus, the headlamp may secure a front view of a road at night, while other vehicles and obstacles may be identified on the road to achieve safe driving.

On the other hand, as the headlamp radiates light at a fixed position on the ground, the light irradiation position of the headlamp is limited, making it difficult to obtain the quantity of light according to a road surface condition.

Accordingly, a leveling system in which a light radiation angle is adjusted in a vertical direction is applied to the headlamp.

The leveling system of the headlamp detects the amount of change in a suspension of a vehicle using a mechanical sensor mounted on a trailing arm in the vehicle. The system then derives the inclination of a vehicle body to adjust the light radiating direction of the headlamp. However, this is problematic in that a tire pressure and a height difference are ignored, so the accuracy of the light irradiation position is deteriorated.

Further, as another example of the leveling system of the headlamp, the light radiating direction of the headlamp is adjusted in conjunction with a method of predicting a vehicle posture based on the direction of gravity using an acceleration sensor provided in the vehicle. However, this is problematic in that a change in the inclination of the vehicle body according to an uphill or downhill road is not detected, so the light irradiation position of the headlamp is not controlled.

The foregoing is intended merely to aid in the understanding of the background of the present disclosure. The foregoing is not intended to mean that the present disclosure falls within the purview of the related art that is already known to those having ordinary skill in the art.

SUMMARY

The present disclosure has been made keeping in mind the above problems occurring in the related art. An objective of the present disclosure is to provide an automatic leveling system and method for a headlamp, which accurately detects whether a road is uphill or downhill, and a lateral gradient condition of the road. The system and method further automatically adjust a light radiating direction through the headlamp according to the road. Further, another objective of the present disclosure is to provide an automatic leveling system and method for a headlamp, in which a sensor capable of scanning a road surface and a lamp module radiating light are integrated with each other, so a light irradiation position is accurately and rapidly adjusted according to a road condition. Thus, the automatic leveling system and method for a headlamp may have improved accuracy and reliability of the light irradiation position.

In order to achieve the objectives of the present disclosure, the present disclosure provides an automatic leveling system for a headlamp. The system includes: a lamp module configured to radiate light and change a light irradiation position, a camera sensing part collecting image capturing information about a front of a mobility device using an image capturing device, and a laser sensing part collecting sensing information according to an object in front of the mobility device and a road surface condition using a laser sensor. The system further includes a controller configured to check a surrounding state of the mobility device based on the image capturing information and the sensing information, identify the road surface condition after being divided into a long-distance measurement and a short-distance measurement according to the surrounding state of the mobility device, and identify the road surface condition based on the image capturing information of the long-distance measurement. The controller is further configured to identify the road surface condition based on the sensing information of the short-distance measurement, and adjust and control the aiming of the lamp module according to the identified road surface condition.

The controller is further configured to adjust and control the aiming of the lamp module based on the image capturing information according to the long-distance measurement when a forward lane is identified as the surrounding state.

The controller may be further configured to check a central line that horizontally and vertically traverses a central point in an image capturing area of the image capturing device, derive a vanishing point at which lanes on opposite sides of the mobility device join in the image capturing area, and check whether the central line and the vanishing point match each other. Thus, the controller may adjust and control the aiming of the lamp module according to a distance difference between the central line and the vanishing point.

The controller may be further configured to check a horizontal central line from the central line, and set a virtual horizontal line based on the vanishing point. Thus, the controller may determine whether the road is uphill or downhill according to a difference in height between the horizontal central line and the virtual horizontal line.

The controller may be further configured to check the horizontal central line from the central line, and identify a posture of the mobility device according to an inclination degree of the horizontal central line.

The controller may be further configured to check a vertical central line from the central line. Additionally, the controller may be further configured to derive a road gradient condition according to a direction and a distance in which the position of the vanishing point is laterally spaced from the vertical central line.

The controller may be further configured to adjust and control the aiming of the lamp module based on the sensing information according to the short-distance measurement, when the surrounding state is a case where an object is present around the mobility device and thus a lane is not identified.

The controller may be further configured to check a sensing angle as the laser sensor senses the road. Additionally, the controller may be configured to adjust and control the aiming of the lamp module according to a range in which the sensing angle is out of a reference angle, when the sensing angle is out of a preset reference angle.

The controller may be further configured to check the image capturing area of the image capturing device and the sensing area of the laser sensor. Additionally, the controller may be configured to store, as a reference area, an area in which an initial image capturing area and the sensing area overlap.

The controller may be further configured to receive a common area where the image capturing area and the sensing area overlap when the mobility device is started. Additionally, the controller may be configured to correct the central point of the image capturing area so that the common area and the reference area match each other when the common area and the reference area do not match each other.

The lamp module may be configured to be movable along with the laser sensor so the sensing area of the laser sensor may be changed together when an angle of the lamp module is corrected.

The controller may be further configured to receive the common area where the image capturing area and the sensing area overlap when the mobility device is driving. Additionally, the controller may be further configured to control movement of the lamp module and the laser sensor so that the common area matches the reference area when the common area does not match the reference area as the image capturing area and the sensing area are changed.

The controller may be further configured to check driving state information of the mobility device, utilize long-distance measurement information when the mobility device is driving at a high speed, and utilize sensing information according to the short-distance measurement when the mobility device is driving at a low speed or is stopping, thus adjusting and controlling the aiming of the lamp module.

Further, in order to achieve the objectives of the present disclosure, the present disclosure provides an automatic leveling method for a headlamp. The method includes: an image capturing information collecting step for collecting image capturing information through an image capturing device, a sensing information collecting step for collecting sensing information through a laser sensor, and a determining step for determining a long-distance measurement or a short-distance measurement based on a surrounding state. The method further includes a first correcting step for adjusting an aiming of a lamp module based on a road surface condition identified based on the image capturing information when the long-distance measurement is determined, and a second correcting step for adjusting the aiming of the lamp module based on the road surface condition identified based on the sensing information when the short-distance measurement is determined.

The determining step may determine the long-distance measurement when a forward lane is identified as the surrounding state.

The first correcting step may check a central line that horizontally and vertically traverses a central point in an image capturing area of the image capturing device, derive a vanishing point at which lanes on opposite sides of the mobility device join in the image capturing area, and check whether the central line and the vanishing point match each other. Thus, the first correcting step adjusts and controls the aiming of the lamp module according to a distance difference between the central line and the vanishing point.

The first correcting step may check a horizontal central line from the central line, and set a virtual horizontal line based on the vanishing point. Thus, the first correcting step may determine whether the road is uphill or downhill according to a difference in height between the horizontal central line and the virtual horizontal line.

The first correcting step may check a vertical central line from the central line, and derive a curvature of the road according to a direction and a distance in which a position of the vanishing point is laterally spaced from the vertical central line.

The short-distance measurement may be determined in the determining step when the surrounding state is a case where an object is present about the mobility device and thus a lane is not identified.

The second correcting step may check a sensing angle as the laser sensor senses the road, and adjust and control the aiming of the lamp module according to a range in which the sensing angle is out of a reference angle, when the sensing angle is out of a preset reference angle.

The determining step may further include an adjusting step for checking the image capturing area of the image capturing device and a sensing area of the laser sensor. The adjusting step may further store, as a reference area, an area in which an initial image capturing area and the sensing area overlap.

The adjusting step may receive a common area where the image capturing area and the sensing area overlap when the mobility device is started. Additionally, the adjusting step may correct the central point of the image capturing area so that the common area and the reference area match each other when the image capturing area and the sensing area do not match each other.

The adjusting step may receive the common area where the image capturing area and the sensing area overlap when the mobility device is driving. Additionally, the adjusting step may control movement of the lamp module and the laser sensor so that the common area matches the reference area when the common area does not match the reference area as the image capturing area and the sensing area are changed.

According to the present disclosure, an automatic leveling system and method for a headlamp accurately detects whether a road is uphill or downhill, and a lateral gradient condition of the road. The system and method further automatically adjust a light radiating direction through the headlamp according to the road. Further, a sensor capable of scanning a road surface and a lamp module radiating light are integrated with each other, so a light irradiation position is accurately and rapidly adjusted according to a road condition. Thus, the automatic leveling system and method for a headlamp may have improved accuracy and reliability of the light irradiation position.

Further, as the light irradiation position of a headlamp is adjusted by comparing image capturing information obtained through an image capturing device with sensing information obtained through a laser sensor, the deterioration of aiming accuracy due to the mounting state of a camera is prevented.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Hereinafter, the embodiments of the present disclosure are described in detail with reference to the accompanying drawings. The same reference numerals are used throughout the drawings to designate the same or similar components.

Further, the terms "module," "unit," and the like described in this specification are given or used together for the ease of description, but do not have a distinct meaning or function.

When it is determined that the detailed description of the known art related to the present disclosure may obscure the gist of the disclosure, the detailed description thereof is omitted. Further, it is to be understood that the accompanying drawings are merely for making those having ordinary skill in the art easily understand the embodiments disclosed herein. Furthermore, the present disclosure is intended to cover not only embodiments disclosed herein but also various alternatives, equivalents, or substitutes that fall within the spirit and scope of the present disclosure.

Although the terms "first," "second," and the like may be used herein to describe various elements, these elements should not be limited by these terms. These terms are only used to distinguish one element from another element.

It should be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

Herein, the singular forms are intended to include the plural forms as well, unless the context clearly indicates otherwise.

It should be further understood that the terms "comprise," "include," "have," and the like, when used in this specification, specify the presence of stated features, integers, steps, operations, elements, components, and/or combinations thereof. However, the terms do not preclude the presence or addition of one or more other features, integers, steps, operations, elements, components, and/or combinations thereof. When a component, device, element, or the like of the present disclosure is described as having a purpose or performing an operation, function, or the like, the component, device, or element should be considered herein as being "configured to" meet that purpose or to perform that operation or function.

A controller may include a communication device that communicates with another controller or a sensor to control a desired function, a memory that stores an operating system, logic command or input/output information, and one or more processors. The processors may perform decisions, calculations, determinations, and the like required for controlling a desired function.

Figure 1:
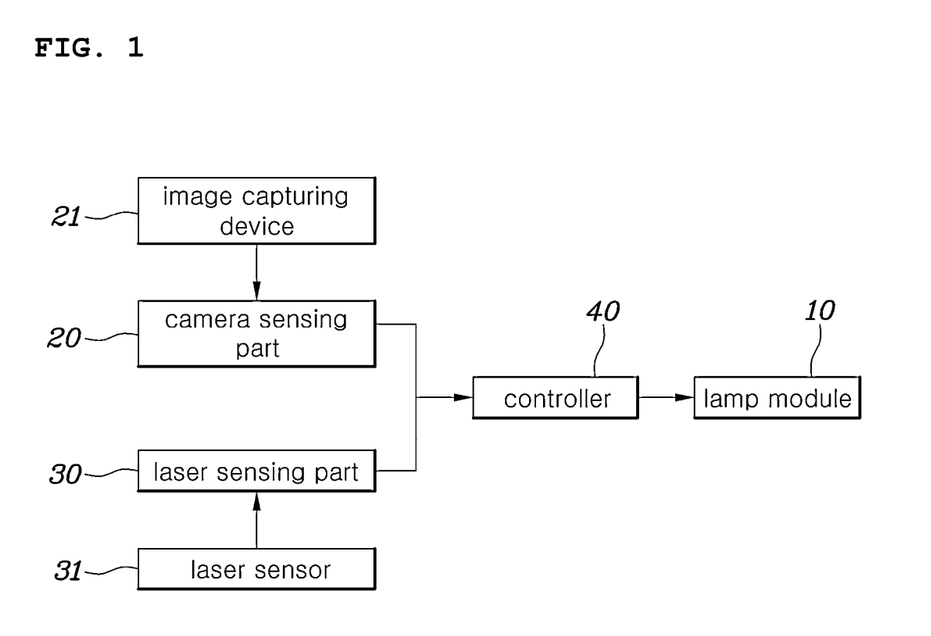
FIG. 1 is a diagram illustrating the configuration of an automatic leveling system for a headlamp according to an embodiment of the present disclosure.
Figure 2:
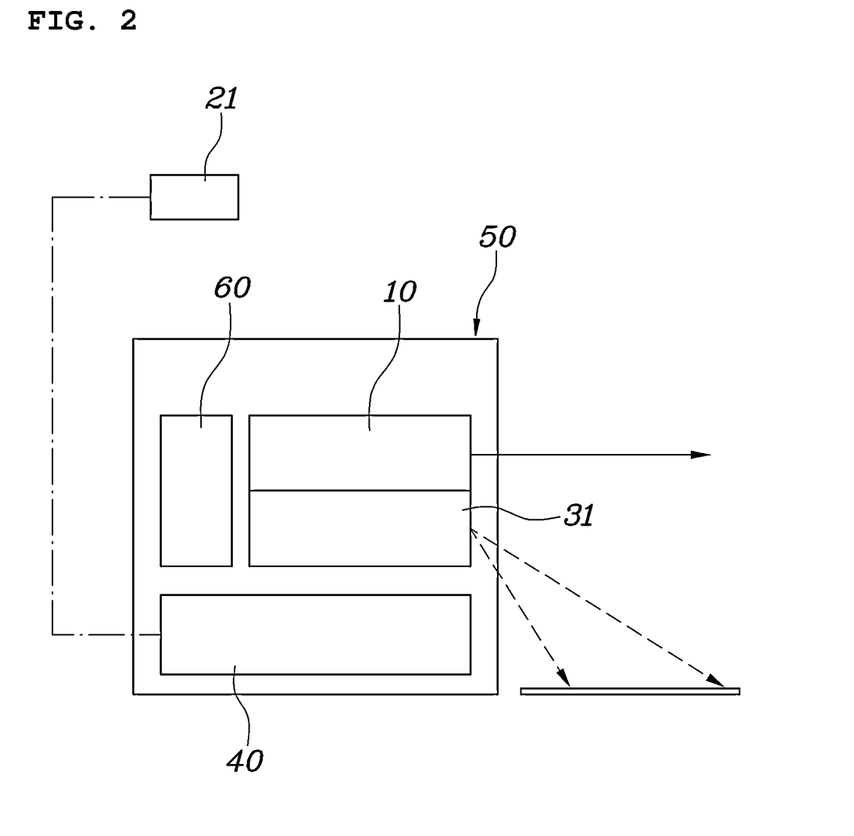
FIG. 2 is a diagram illustrating a lamp module according to an embodiment of the present disclosure.
Figure 3:
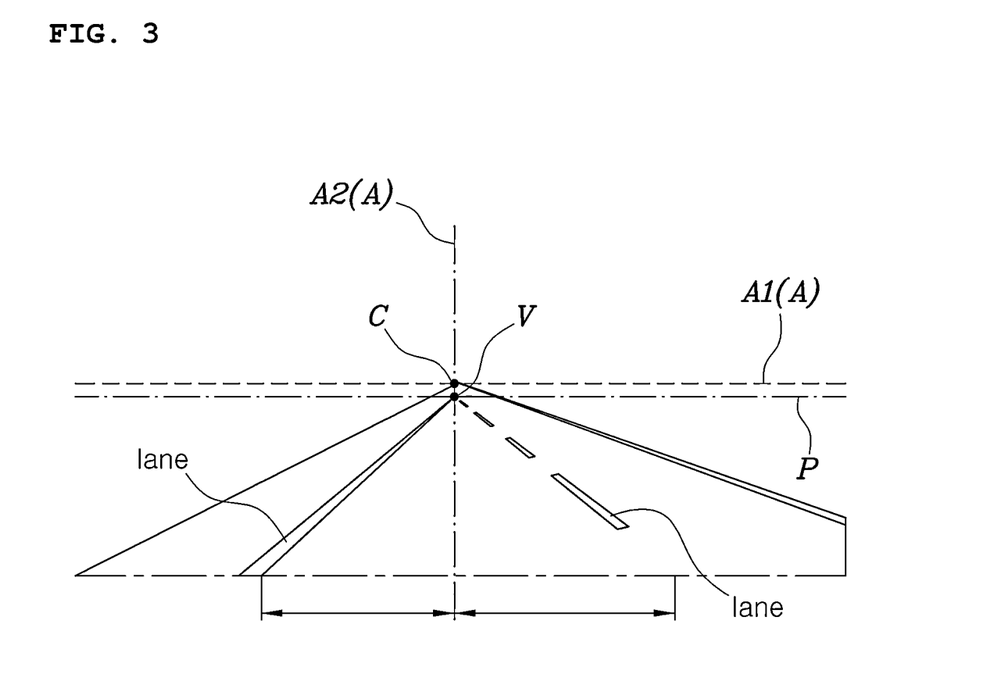
FIG. 3 is a diagram illustrating an adjustment of aiming of the lamp module according to an embodiment of the present disclosure.
Figure 4:
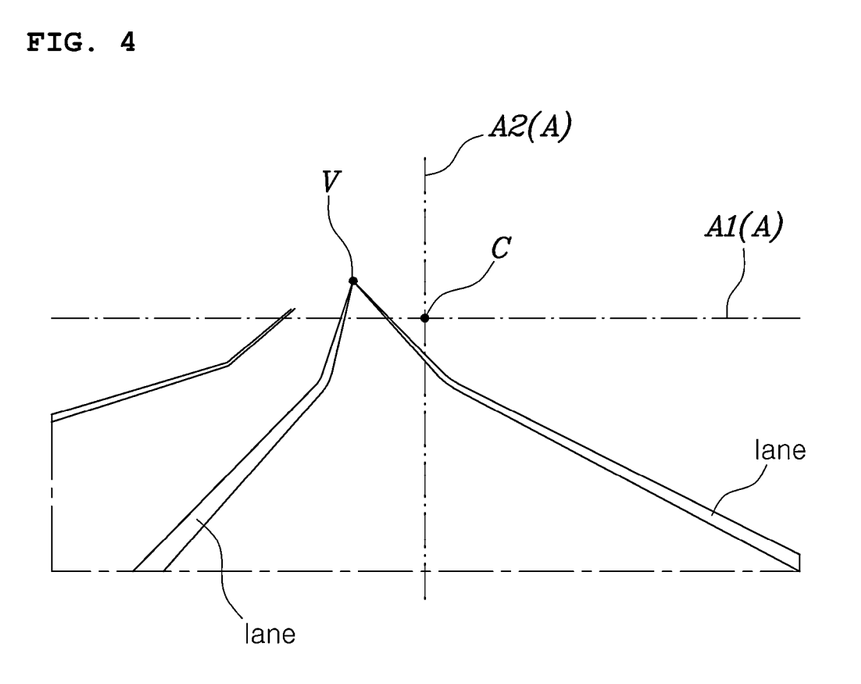
FIG. 4 is a diagram illustrating another embodiment of the adjustment of aiming of the lamp module according to an embodiment of the present disclosure.
Figure 5:
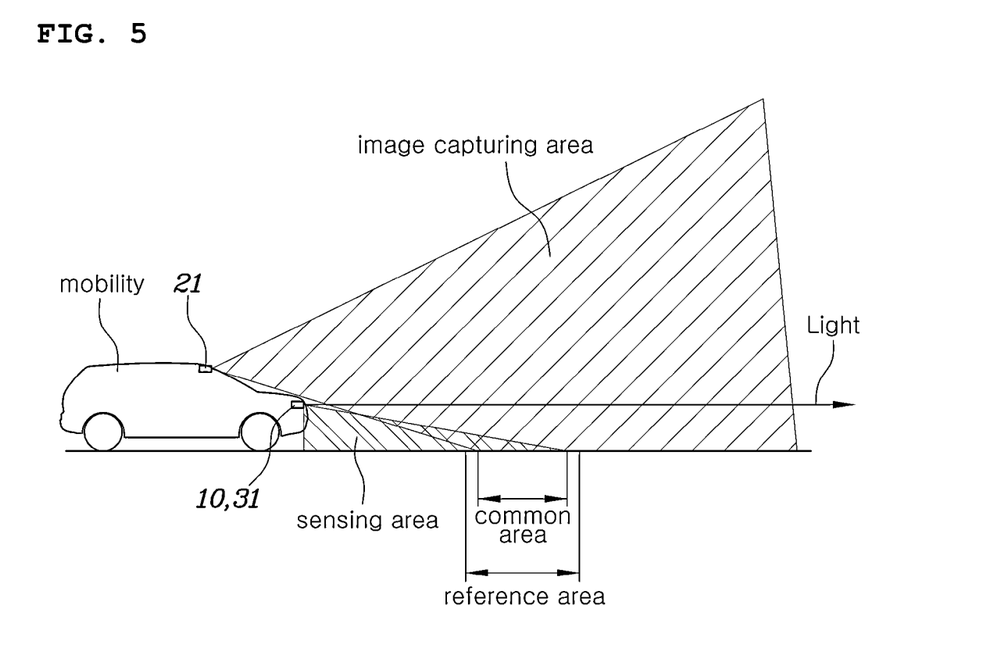
FIG. 5 is a diagram illustrating a further embodiment of the adjustment of aiming of the lamp module according to an embodiment of the present disclosure.

FIG. 1 is a diagram illustrating the configuration of an automatic leveling system for a headlamp according to the present disclosure. FIG. 2 is a diagram illustrating a lamp module according to an embodiment of the present disclosure. FIG. 3 is a diagram illustrating an embodiment of the adjustment of aiming of the lamp module according to the present disclosure. FIG. 4 is a diagram illustrating another embodiment of the adjustment of aiming of the lamp module according to the present disclosure. FIG. 5 is a diagram illustrating a further embodiment of the adjustment of aiming of the lamp module according to the present disclosure.

Figure 6:
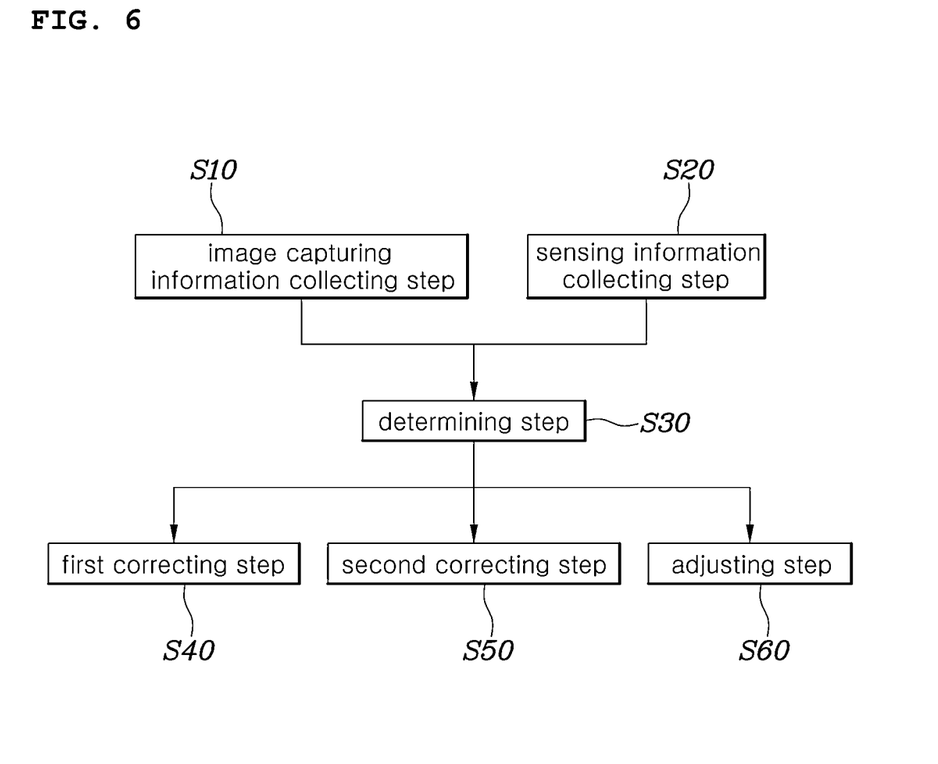
FIG. 6 is a flowchart illustrating an automatic leveling method for a headlamp according to an embodiment of the present disclosure.
Figure 7:
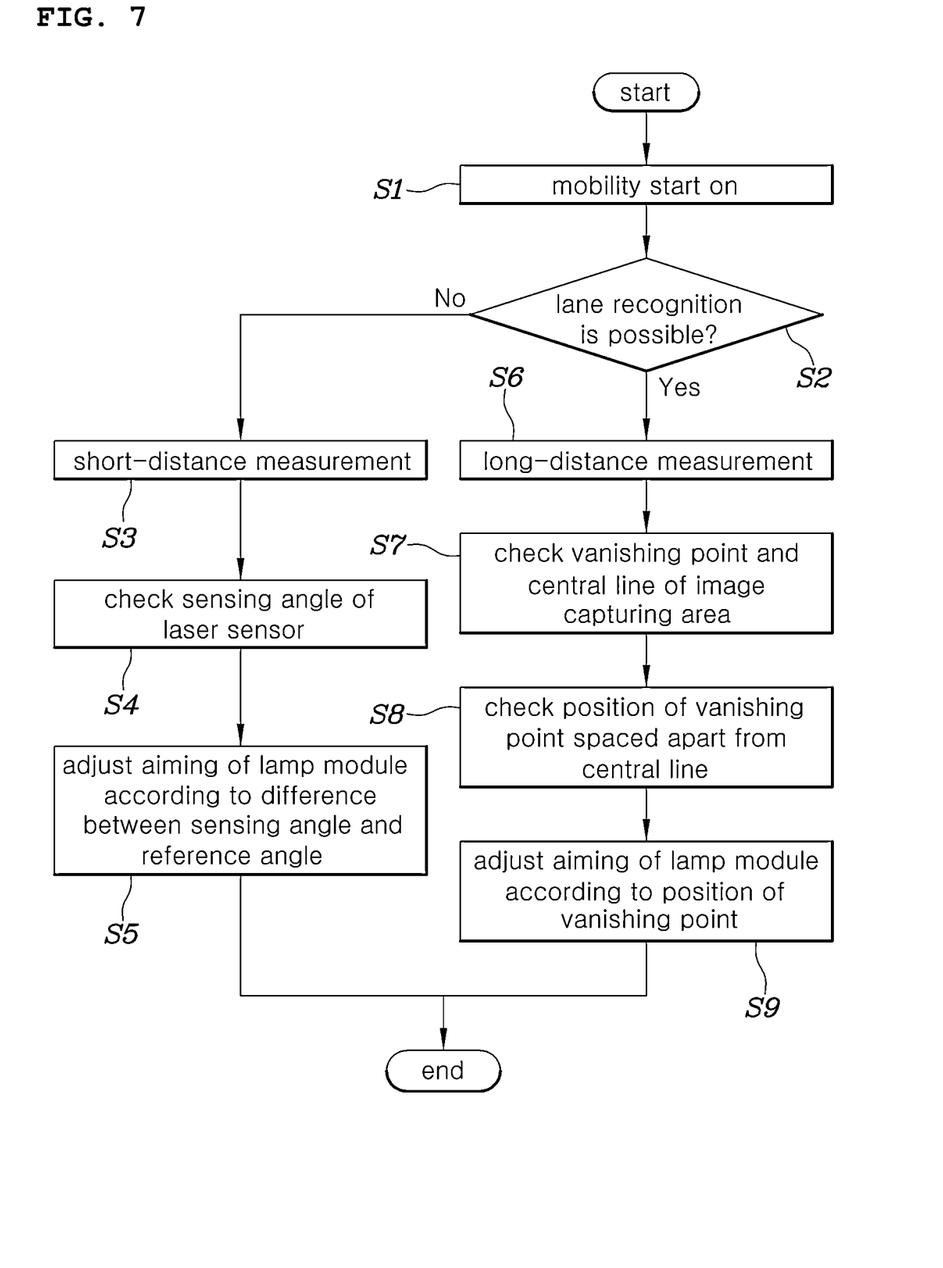
FIG. 7 is a flowchart illustrating an embodiment of the automatic leveling method for the headlamp shown in FIG. 6.
Figure 8:
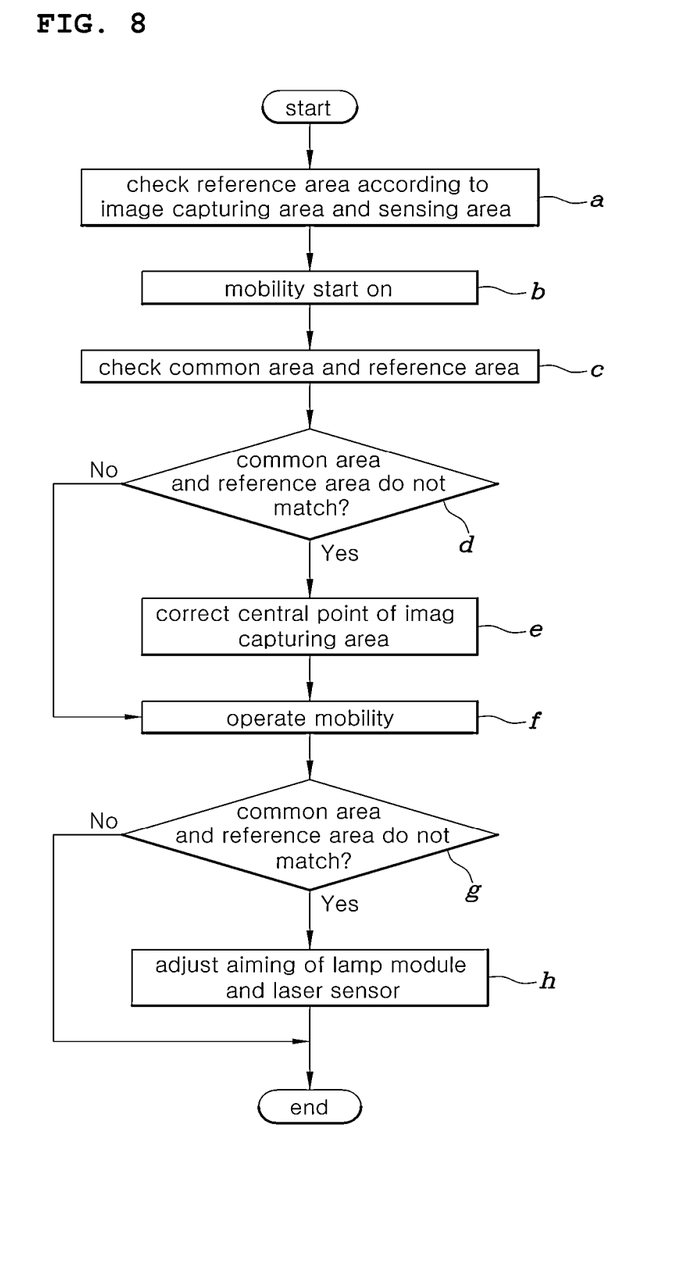
FIG. 8 is a flowchart illustrating another embodiment of the automatic leveling method for the headlamp shown in FIG. 6.

Further, FIG. 6 is a flowchart illustrating an automatic leveling method for a headlamp according to the present disclosure. FIG. 7 is a flowchart illustrating an embodiment of the automatic leveling method for the headlamp shown in FIG. 6. FIG. 8 is a flowchart illustrating another embodiment of the automatic leveling method for the headlamp shown in FIG. 6.

As shown in FIG. 1, the automatic leveling system for the headlamp, according to the present disclosure, includes a lamp module 10 that is configured to radiate light and change a light irradiation position. The automatic leveling system for the headlamp also includes a camera sensing part 20 that collects image capturing information about a front of a mobility device (e.g., a vehicle, a mobile machine, and the like) using an image capturing device 21. The leveling system for the headlamp further includes a laser sensing part 30 that collects sensing information according to an object in front of the mobility device and a road surface condition using a laser sensor 31, and a controller 40. The controller 40 checks a surrounding state of the mobility device based on the image capturing information and the sensing information, and identifies the road surface condition after being divided into a long-distance measurement and a short-distance measurement according to the surrounding state of the mobility device. The controller 40 also identifies the road surface condition based on the image capturing information in the case of the long-distance measurement, identifies the road surface condition based on the sensing information in the case of the short-distance measurement, and adjusts and controls the aiming of the lamp module 10 according to the identified road surface condition.

The lamp module 10 may be configured to be movable along with the laser sensor 31 so a sensing area of the laser sensor 31 may be changed together when an angle of the lamp module 10 is corrected. Thus, as shown in FIG. 2, as the lamp module 10 and the laser sensor 31 may be installed together in one housing 50, and the lamp module 10, the laser sensor 31, a tilting means 60, and the controller 40 are provided in the housing 50, respective components may be integrated to form the headlamp. Further, the lamp module 10 and the laser sensor 31 may be mounted on the tilting means 60 that is installed in the housing 50 to be vertically tiltable. Thus, depending on whether the tilting means 60 is tilted, the lamp module 10 and the laser sensor 31 are rotated together, so the light radiating direction of the lamp module 10 and the sensing area of the laser sensor 31 may be changed together. In this regard, the tilting means 60 is controlled by the controller 40 to determine the tilting operation.

The image capturing device 21 is composed of a camera to capture an image of the front of the mobility device, and the camera sensing part 20 converts it into data as the image capturing information.

The laser sensor 31 identifies the road condition by radiating sensing light onto the front of the mobility device, and the laser sensing part 30 converts it into data as the sensing information.

The controller 40 receives the image capturing information and the sensing information through the camera sensing part 20 and the laser sensing part 30. The controller 40 then checks the surrounding state of the mobility device based on the image capturing information and the sensing information. The surrounding state of the mobility device may be a surrounding object, a lane, and a road condition.

As such, the controller 40 checks the surrounding state of the mobility device, determines a case where there is no object beyond a certain distance in front of the mobility device as the long-distance measurement, and determines a case where there is an object within the certain distance in front of the mobility device as the short-distance measurement, thus identifying the road surface condition. In other words, since the laser sensor 31 easily identifies an object or a road in a short distance from the mobility device, and the image capturing device 21 easily identifies a long distance in front of the mobility device, the controller 40 divides the measurement into the short-distance measurement and the long-distance measurement. The controller 40 divides the measurement into the short-distance measurement and the long-distance measurement depending on the surrounding state of the mobility device to accurately identify the road surface condition.

Thereby, the controller 40 adjusts the light radiation aiming of the lamp module 10 by identifying the road surface condition based on the image capturing information in the case of the long-distance measurement. Additionally, the controller 40 adjusts the light radiation aiming of the lamp module 10 by identifying the road surface condition based on the sensing information in the case of the short-distance measurement. Thus, the controller 40 may improve the aiming accuracy and reliability of the lamp module 10.

The present disclosure is described below in detail. The controller 40 adjusts and controls the aiming of the lamp module 10 based on the image capturing information according to the long-distance measurement when a forward lane is identified as the surrounding state.

In other words, the controller 40 checks whether there is a lane in front of the mobility device through the image capturing information. The controller 40 checks whether there is a pair of lanes on opposite sides of the mobility device, determines a case where the pair of lanes is identified as the long-distance measurement, and adjusts and controls the aiming of the lamp module 10 based on the image capturing information. Further, the recognition of the lane in front of the mobility device corrects the lane depending on the driving speed of the mobility device and the object existing in front of the mobility device, so the aiming accuracy of the lamp module 10 according to the long-distance measurement using the lane may be improved.

In detail, as shown in FIG. 3, the controller 40 may check a central line A that horizontally and vertically traverses a central point C in an image capturing area of the image capturing device 21. The controller 40 may derive a vanishing point V at which the lanes on the opposite sides of the mobility device join in the image capturing area. Additionally, the controller 40 may check whether the central line A and the vanishing point V match each other. Thus, the controller 40 may adjust and control the aiming of the lamp module 10 according to a distance difference between the central line A and the vanishing point V.

In other words, the controller 40 may receive the image capturing information to identify the distance, angle, and shape of the opposite lanes. Based on these, the controller 40 may derive the vanishing point "V" at which the lanes identified through the image capturing information are joined.

Further, the central point "C," according to an initial design, is provided in the image capturing area, and the central line "A" horizontally and vertically traversing the central point "C" is provided. The central point "C" and the central line "A" may be determined according to the height and angle of the image capturing device 21 installed in the mobility device and the road surface.

Thus, the controller 40 may check whether the central line A and the vanishing point "V" match each other. The controller 40 may adjust and control the aiming of the lamp module 10 based on the distance and direction between the vanishing point "V" and the central line "A" when the vanishing point "V" is spaced apart from the central line A. Thus, the controller 40 may adjust the aiming of the lamp module 10 according to the posture of the mobility device or the condition of the road surface.

In detail, the controller 40 may check a horizontal central line A1 from the central line A, and set a virtual horizontal line "P" based on the vanishing point "V", thus determining whether the road is uphill or downhill according to a difference in height between the horizontal central line "A1" and the virtual horizontal line "P".

As shown in FIG. 3, the controller 40 may set the horizontal central line "A1" traversing the central point "C" in the horizontal direction, and may set the virtual horizontal line "P" traversing the vanishing point "V" in the horizontal direction. The controller 40 does not adjust the aiming of the lamp module 10 when the virtual horizontal line "P" matches the horizontal central line "A1" or approaches the horizontal central line within a certain range. Instead, the controller 40 determines whether the road is uphill or downhill according to a distance by which the virtual horizontal line P deviates from the horizontal central line "A1" when the virtual horizontal line "P" deviates from the horizontal central line "A1" beyond a certain range. In other words, the controller 40 may determine that the road is an uphill slope when the virtual horizontal line "P" is spaced apart from an upper side of the horizontal central line "A1", may determine that the road is a downhill slope when the virtual horizontal line "P" is spaced apart from a lower side of the horizontal central line "A1", and may predict an uphill or downhill slope gradient according to a distance by which the virtual horizontal line "P" is spaced from the horizontal central line "A1". Thus, the controller 40 may adjust and control the aiming of the lamp module 10.

In addition, the controller 40 may check the horizontal central line A1 from the central line A, and may identify the posture of the mobility device according to the inclination degree of the horizontal central line A1.

In other words, the controller 40 may set the horizontal central line A1 traversing the central point C in the horizontal direction based on the image capturing information, and may predict the posture of the mobility device according to the inclination degree of the horizontal central line A1. For example, when a left end of the horizontal central line A1 moves downwards and a right end thereof moves upwards, the controller 40 may predict that the mobility device is driving on a road inclined upwards to the right or is turning right. Thereby, the controller 40 may control aiming such that the angle is adjusted upward in the case of the left lamp module 10 and the angle is adjusted downward in the case of the right lamp module 10.

On the other hand, the controller 40 may check a vertical central line "A2" from the central line "A," and derive the curvature of the road according to a direction and a distance in which the position of the vanishing point "V" is laterally spaced from the vertical central line "A2".

As shown in FIG. 4, the controller 40 may set the vertical central line A2 traversing the central point C in the vertical direction, and may identify the position of the vanishing point V. The controller 40 does not adjust the aiming of the lamp module 10 when the position of the vanishing point V matches the vertical central line A2 or approaches the vertical central line within a certain range. Instead, the controller 40 determines the lateral gradient of the road according to a distance by which the vanishing point V deviates from the vertical central line A2 when the vanishing point V deviates from the vertical central line A2 beyond a certain range. In other words, the controller 40 may determine that the road is a leftward lateral gradient when the vanishing point V is moved to a left side of the vertical central line A2 to be spaced apart therefrom, and may determine that the road is a rightward lateral gradient when the vanishing point V is moved to a right side of the vertical central line A2 to be spaced apart therefrom. Furthermore, the controller 40 may predict a lateral gradient degree according to a distance by which the vanishing point V is spaced from the vertical central line A2. Thus, the controller 40 may control the aiming of the lamp module 10.

On the other hand, when the surrounding state is a case where an object is present near the mobility device and thus a lane is not identified, the controller 40 adjusts and controls the aiming of the lamp module 10 based on the sensing information according to the short-distance measurement.

In other words, the controller 40 checks whether the object is present or the lane is identified in front of the mobility device through the image capturing information and the sensing information. When the object is present or the lane is identified in front of the mobility device, the controller 40 adjusts and controls the aiming of the lamp module 10 based on the sensing information determined through the short-distance measurement.

In detail, the controller 40 checks a sensing angle as the laser sensor 31 senses the road. Additionally, the controller 40 adjusts and controls the aiming of the lamp module 10 according to a range in which the sensing angle is out of a reference angle, when the sensing angle is out of a preset reference angle.

The laser sensor 31 sets the sensing angle for the road as it detects an object that is close to the mobility device and road information. In other words, the controller 40 receives the sensing information, thus checking the sensing angle as the laser sensor 31 radiates laser, and adjusts the aiming of the lamp module 10 according to a distance by which the sensing angle is upwardly or downwardly spaced apart from the reference angle when the sensing angle is out of the preset reference angle. In the case of the short-distance measurement, the road surface condition is identified based on the sensing information and the aiming of the lamp module 10 is adjusted, so the aiming accuracy and reliability of the lamp module 10 are improved.

As such, the controller 40 further checks the driving state information of the mobility device, utilizes long-distance measurement information when the mobility device is driving at high speed, and utilizes sensing information according to the short-distance measurement when the mobility device is driving at low speed or is stopping. Thus, the controller 40 adjusts the aiming of the optimized lamp module 10 according to the driving state of the mobility device.

As shown in FIG. 5, the controller 40 may check the image capturing area of the image capturing device 21 and the sensing area of the laser sensor 31, and may store, as a reference area, an area in which an initial image capturing area and the sensing area overlap. The reference area may be a previously stored common area where the image capturing area of the image capturing device 21 and the sensing area of the laser sensor 31 overlap when the image capturing device 21 and the laser sensor 31 are first installed. Accordingly, the controller 40 compares the image capturing area and the sensing area with the reference area, so the controller 40 may correct the mounting of the image capturing device 21 even if it is incorrectly mounted and may adjust the aiming of the lamp module 10.

In detail, the controller 40 may receive the common area where the image capturing area and the sensing area overlap when the mobility device is started. Additionally, the controller 40 may correct the central point C of the image capturing area so that the common area and the reference area match each other when the common area and the reference area do not match each other.

The image capturing area of the image capturing device 21 and the sensing area of the laser sensor 31 have common overlapping area in front of the mobility device. Thus, the reference area for the image capturing area and the sensing area is stored in the controller 40, and the controller 40 compares the common area with the reference area based on the input image capturing information and sensing information. The controller 40 may compare the common area with the reference area when the mobility device is started, and may correct the central point C of the image capturing area so that the common area and the reference area match each other when the common area and the reference area do not match each other.

The controller 40 corrects the central point C of the image capturing area based on the reference area when the mobility device is started, thus securing the aiming accuracy of the lamp module 10 according to the image capturing area and the sensing area even if an error occurs in the mounting state of the image capturing device 21. In other words, as the image capturing device 21 is configured to sense a long distance, an error range is increased due to a defective mounting state. Thus, the reference area is checked based on the sensing area of the laser sensor 31 that senses a short distance. Thereby, the controller 40 corrects the central point C of the image capturing area with the reference area when the mobility device is started, so the aiming accuracy of the lamp module 10 can be secured even if the installation tolerance of the image capturing device 21 occurs.

On the other hand, the controller 40 may receive the common area where the image capturing area and the sensing area overlap when the mobility device is driving. Additionally, the controller 40 may control the movement of the lamp module 10 and the laser sensor 31 so that the common area matches the reference area when the common area does not match the reference area as the image capturing area and the sensing area are changed.

In other words, the controller 40 receives the image capturing information and the sensing information to check the common area. When it is checked that the mobility device is driving, the controller 40 identifies the common area that is changed by the road condition or the change in posture, thus comparing the common area with the reference area. When the common area and the reference area do not match beyond a certain range, the controller 40 determines that the posture of the mobility device is changed, thus adjusting the aiming of the lamp module 10 so that the common area matches the reference area. Thus, the present disclosure may accurately perform the aiming of the lamp module 10 in response to the posture of the vehicle including the amount of change in suspension, and various conditions of the road, thereby improving reliability.

As shown in FIG. 6, an automatic leveling method for a headlamp, according to the present disclosure, includes: an image capturing information collecting step S10 for collecting image capturing information through an image capturing device 21, and a sensing information collecting step S20 for collecting sensing information through a laser sensor 31. The automatic leveling method for a headlamp further includes a determining step S30 for determining long-distance measurement or short-distance measurement according to a surrounding state, and a first correcting step S40 for adjusting the aiming of a lamp module 10 depending on a road surface condition identified based on the image capturing information when the long-distance measurement is determined. Furthermore, the automatic leveling method for a head lamp includes a second correcting step S50 for adjusting the aiming of the lamp module 10 depending on the road surface condition identified based on the sensing information when the short-distance measurement is determined.

In the image capturing information collecting step S10, an image of the front of the mobility device is captured through the image capturing device 21 composed of a camera. The image is then converted into data as the image capturing information.

In the sensing information collecting step S20, the road condition in front of the mobility device is identified through the laser sensor 31, and then is converted into data as the sensing information.

On the other hand, in the determining step S30, the surrounding state of the mobility device is checked based on the image capturing information and the sensing information, thus determining the long-distance measurement or the short-distance measurement depending on the surrounding state. When the long-distance measurement is determined through the determining step S30, the first correcting step S40 is performed to adjust the aiming of the lamp module 10 depending on the road surface condition identified based on the image capturing information. When the short-distance measurement is determined, the second correcting step S50 is performed to adjust the aiming of the lamp module 10 depending on the road surface condition identified based on the sensing information. Thereby, the aiming accuracy and reliability of the lamp module 10 are improved.

In detail, the determining step S30 may determine the long-distance measurement when a forward lane is identified as the surrounding state.

When it is checked that there is a pair of lanes on opposite sides of the mobility device through the image capturing information collecting step S10 and the sensing information collecting step S20, the long-distance measurement is determined. The aiming of the lamp module 10 is adjusted and controlled based on the image capturing information.

The first correcting step S40 checks a central line A that horizontally and vertically traverses a central point C in an image capturing area of the image capturing device 21, derives a vanishing point V at which the lanes on the opposite sides of the mobility device join in the image capturing area, and checks whether the central line A and the vanishing point V match each other. Thus, the first correcting step S40 adjusts and controls the aiming of the lamp module 10 according to a distance difference between the central line A and the vanishing point V.

In other words, the first correcting step S40 receives the image capturing information to identify the distance, angle, and shape of the opposite lanes, thus deriving the vanishing point V at which the lanes are joined. Further, the central point C according to an initial design is provided in the image capturing area, and the central line A horizontally and vertically traversing the central point C is provided. Thus, the first correcting step S40 may check whether the central line A and the vanishing point V match each other, and may adjust and control the aiming of the lamp module 10 based on the distance and direction between the vanishing point V and the central line A when the vanishing point V is spaced apart from the central line A. Thus, the first correcting step S40 adjusts the aiming of the lamp module 10 according to the posture of the mobility device or the condition of the road surface.

Further, the first correcting step S40 may check a horizontal central line A1 from the central line A, and set a virtual horizontal line P based on the vanishing point V. Thus, determining whether the road is uphill or downhill according to a difference in height between the horizontal central line A1 and the virtual horizontal line P.

As such, the first correcting step S40 sets the horizontal central line A1 traversing the central point C in the horizontal direction, and sets the virtual horizontal line P traversing the vanishing point V in the horizontal direction. When the virtual horizontal line P deviates from the horizontal central line A1 beyond a certain range, it is determined whether the road is uphill or downhill according to a distance by which the virtual horizontal line P deviates from the horizontal central line A1. Thereby, the first correcting step S40 may predict an uphill or downhill slope gradient according to a distance by which the virtual horizontal line P is spaced from the horizontal central line A1, thus adjusting and controlling the aiming of the lamp module 10.

In addition, the first correcting step S40 may check a vertical central line A2 from the central line A, and derive a gradient condition of the road according to a direction and a distance in which the position of the vanishing point V is laterally spaced from the vertical central line A2.

In other words, the first correcting step S40 sets the vertical central line A2 traversing the central point C in the vertical direction. When the vanishing point V deviates from the vertical central line A2 beyond a certain range, the lateral gradient of the road is determined according to a distance by which the vanishing point V deviates from the vertical central line A2, thus controlling the aiming of the lamp module 10.

On the other hand, when the surrounding state is a case where an object is present about the mobility device and thus a lane is not identified, the short-distance measurement may be determined in the determining step S30.

In other words, the determining step S30 receives the sensing information thus checking the sensing angle as the laser sensor 31 radiates the laser, and adjusts the aiming of the lamp module 10 according to a distance by which the sensing angle is upwardly or downwardly spaced apart from the reference angle when the sensing angle is out of a preset reference angle.

Thus, the second correcting step S50 checks a sensing angle as the laser sensor 31 senses the road, and adjusts and controls the aiming of the lamp module 10. The second correcting step S50 adjusts and controls the aiming of the lamp module 10 according to a range in which the sensing angle is out of a reference angle when the sensing angle is out of a preset reference angle.

In other words, the second correcting step S50 receives the sensing information, thus checking the sensing angle as the laser sensor 31 radiates the laser. The second correcting step S50 then adjusts the aiming of the lamp module 10 according to a distance by which the sensing angle is upwardly or downwardly spaced apart from the reference angle when the sensing angle is out of a preset reference angle. As such, in the case of the short-distance measurement, the road surface condition is identified based on the sensing information to adjust the aiming of the lamp module 10, thus improving the aiming accuracy and reliability of the lamp module 10.

On the other hand, the determining step S30 further includes an adjusting step S60 for checking the image capturing area of the image capturing device 21 and the sensing area of the laser sensor 31. Additionally, the adjusting step S60 may store, as a reference area, an area in which an initial image capturing area and the sensing area overlap.

In detail, the adjusting step S60 receives the common area where the image capturing area and the sensing area overlap when the mobility device is started, and corrects the central point C of the image capturing area. The central point C of the image capturing is corrected so that the common area and the reference area match each other when the common area and the reference area do not match each other.

As such, the adjusting step S60 corrects the central point C of the image capturing area based on the reference area when the mobility device is started. Thus, the adjusting step S60 secures the aiming accuracy of the head lamp according to the image capturing area and the sensing area even if an error occurs in the mounting state of the image capturing device 21. In other words, as the image capturing device 21 is configured to sense a long distance, an error range is increased due to a defective mounting state. Thus, the reference area is checked based on the sensing area of the laser sensor 31 that senses a short distance. Thereby, the controller 40 corrects the central point C of the image capturing area with the reference area when the mobility device is started, so the aiming accuracy of the lamp module 10 can be secured even if the installation tolerance of the image capturing device 21 occurs.

On the other hand, the adjusting step S60 may receive the common area where the image capturing area and the sensing area overlap when the mobility device is driving, and may control the movement of the lamp module 10 and the laser sensor 31. The movement of the lamp module 10 and the laser sensor 31 may be controlled so that the common area matches the reference area when the common area does not match the reference area as the image capturing area and the sensing area are changed.

In other words, when it is checked that the mobility device is driving, the adjusting step S60 identifies the common area that is changed by the road condition or the change in posture when the mobility device is driving, thus comparing the common area with the reference area. When the common area and the reference area do not match beyond a certain range, the adjusting step determines that the posture of the mobility device is changed, thus adjusting the aiming of the lamp module 10 so that the common area matches the reference area. Thus, the present disclosure may accurately perform the aiming of the lamp module 10 in response to the posture of the vehicle including the amount of change in suspension, and various conditions of the road, thereby improving reliability.

The automatic leveling method for the headlamp, according to the present disclosure, may be performed according to the steps (i.e., S1-S9) shown in FIG. 7 or the steps (i.e., a-h) shown in FIG. 8.

As described herein, the present disclosure provides an automatic leveling system and method for a headlamp, which accurately detects whether a road is uphill or downhill, and a lateral gradient condition of the road. The system and method further automatically adjust a light radiating direction through the headlamp according to the road. Further, a sensor capable of scanning a road surface and a lamp module radiating light are integrated with each other, so a light irradiation position is accurately and rapidly adjusted according to a road condition, thus improving the accuracy and the reliability of the light irradiation position.

Further, as the light irradiation position of a headlamp is adjusted by comparing image capturing information obtained through an image capturing device with sensing information obtained through a laser sensor, the deterioration of the aiming accuracy due to the mounting state of a camera is prevented.

Although the present disclosure was described with reference to specific embodiments shown in the drawings, it should be apparent to those having ordinary skill in the art that the present disclosure may be changed and modified in various ways without departing from the scope of the present disclosure, which is described in the following claims.

What is claimed is:

1. An automatic leveling system for a headlamp, the system comprising:
    a lamp module configured to radiate light and change a light irradiation position;
    a camera sensing part configured to collect image capturing information about a front of mobility device using an image capturing device;
    a laser sensing part configured to collect sensing information according to an object in front of the mobility device and a road surface condition using a laser sensor; and
    a controller configured to:
        check a surrounding state of the mobility device based on the image capturing information and the sensing information;
        identify the road surface condition after being divided into a long-distance measurement and a short-distance measurement according to the surrounding state of the mobility device;
        identify the road surface condition based on the image capturing information of the long-distance measurement;
        identify the road surface condition based on the sensing information of the short-distance measurement; and
        adjust and control an aiming of the lamp module according to the identified road surface condition.

2. The automatic leveling system of claim 1, wherein the controller is further configured to adjust and control the aiming of the lamp module based on the image capturing information according to the long-distance measurement when a forward lane is identified as the surrounding state.

3. The automatic leveling system of claim 2, wherein the controller is further configured to check a central line that horizontally and vertically traverses a central point in an image capturing area of the image capturing device, derive a vanishing point at which lanes on opposite sides of the mobility device join in the image capturing area, and check whether the central line and the vanishing point match each other, thus adjusting and controlling the aiming of the lamp module according to a distance difference between the central line and the vanishing point.

4. The automatic leveling system of claim 3, wherein the controller is further configured to check a horizontal central line from the central line, and set a virtual horizontal line based on the vanishing point, thus determining whether the road is uphill or downhill according to a difference in height between the horizontal central line and the virtual horizontal line.

5. The automatic leveling system of claim 3, wherein the controller is further configured to check the horizontal central line from the central line, and identify a posture of the mobility device according to an inclination degree of the horizontal central line.

6. The automatic leveling system of claim 3, wherein the controller is further configured to check a vertical central line from the central line, and derive a road gradient condition according to a direction and a distance in which the position of the vanishing point is laterally spaced from the vertical central line.

7. The automatic leveling system of claim 1, wherein the controller is further configured to adjust and control the aiming of the lamp module based on the sensing information according to the short-distance measurement, when the surrounding state is a case where an object is present about the mobility device and thus a lane is not identified.

8. The automatic leveling system of claim 7, wherein the controller is further configured to check a sensing angle as the laser sensor senses the road, and adjust and control the aiming of the lamp module according to a range in which the sensing angle is out of a reference angle, when the sensing angle is out of a preset reference angle.

9. The automatic leveling system of claim 1, wherein the controller is further configured to check the image capturing area of the image capturing device and a sensing area of the laser sensor, and store, as a reference area, an area in which an initial image capturing area and the sensing area overlap.

10. The automatic leveling system of claim 9, wherein the controller is further configured to receive a common area where the image capturing area and the sensing area overlap when the mobility device is started, and correct a central point of the image capturing area so that the common area and the reference area match each other when the common area and the reference area do not match each other.

11. The automatic leveling system of claim 9, wherein the lamp module is further configured to be movable along with the laser sensor so the sensing area of the laser sensor is changed together when an angle of the lamp module is corrected.

12. The automatic leveling system of claim 11, wherein the controller is further configured to receive a common area where the image capturing area and the sensing area overlap when the mobility device is driving, and control movement of the lamp module and the laser sensor so that the common area matches the reference area when the common area does not match the reference area as the image capturing area and the sensing area are changed.

13. The automatic leveling system of claim 1, wherein the controller is further configured to check driving state information of the mobility device, utilize long-distance measurement information when the mobility device is driving at high speed, and utilize sensing information according to the short-distance measurement when the mobility device is driving at low speed or is stopping, thus adjusting and controlling the aiming of the lamp module.

14. An automatic leveling method for a headlamp, the method comprising:
an image capturing information collecting step for collecting image capturing information through an image capturing device;
a sensing information collecting step for collecting sensing information through a laser sensor;
a determining step for determining long-distance measurement or short-distance measurement according to a surrounding state;
a first correcting step for adjusting an aiming of a lamp module depending on a road surface condition identified based on the image capturing information when the long-distance measurement is determined; and
a second correcting step for adjusting the aiming of the lamp module depending on the road surface condition identified based on the sensing information when the short-distance measurement is determined.

15. The automatic leveling method of claim 14, wherein the determining step determines the long-distance measurement when a forward lane is identified as the surrounding state.

16. The automatic leveling method of claim 15, wherein the first correcting step includes:
checking a central line that horizontally and vertically traverses a central point in an image capturing area of the image capturing device,
deriving a vanishing point at which lanes on opposite sides of a mobility device join in the image capturing area, and
checking whether the central line and the vanishing point match each other, thus adjusting and controlling the aiming of the lamp module according to a distance difference between the central line and the vanishing point.

17. The automatic leveling method of claim 15, wherein the first correcting step includes:
checking a horizontal central line from the central line, and
setting a virtual horizontal line based on a vanishing point, thus determining whether the road is uphill or downhill according to a difference in height between the horizontal central line and the virtual horizontal line.

18. The automatic leveling method of claim 15, wherein the first correcting step includes:
checking a vertical central line from the central line, and deriving a curvature of the road based on a direction and a distance in which a position of a vanishing point is laterally spaced from the vertical central line.

19. The automatic leveling method of claim 14, wherein the short-distance measurement is determined in the determining step, when the surrounding state is a case where an object is present near a mobility device and thus a lane is not identified.

20. The automatic leveling method of claim 19, wherein the second correcting step includes:
checking a sensing angle as the laser sensor senses the road, and adjusting and controlling the aiming of the lamp module based on a range in which the sensing angle is out of a reference angle, when the sensing angle is out of a preset reference angle.

21. The automatic leveling method of claim 14, wherein the determining step further comprises:

an adjusting step for checking the image capturing area of the image capturing device and a sensing area of the laser sensor, and storing, as a reference area, an area in which an initial image capturing area and the sensing area overlap.

22. The automatic leveling method of claim 21, wherein the adjusting step includes:

receiving a common area where the image capturing area and the sensing area overlap when a mobility device is started, and correcting a central point of the image capturing area so that the common area and the reference area match each other when the image capturing area and the sensing area do not match each other.

23. The automatic leveling method of claim 21, wherein the adjusting step includes:

receiving a common area where the image capturing area and the sensing area overlap when a mobility device is driving, and controlling a movement of the lamp module and the laser sensor so that the common area matches the reference area when the common area does not match the reference area as the image capturing area and the sensing area are changed.

* * * * *